Feb. 6, 1934.   J. T. SCOTT   1,946,037
ELECTRIC FISH WIRE
Filed Oct. 14, 1931
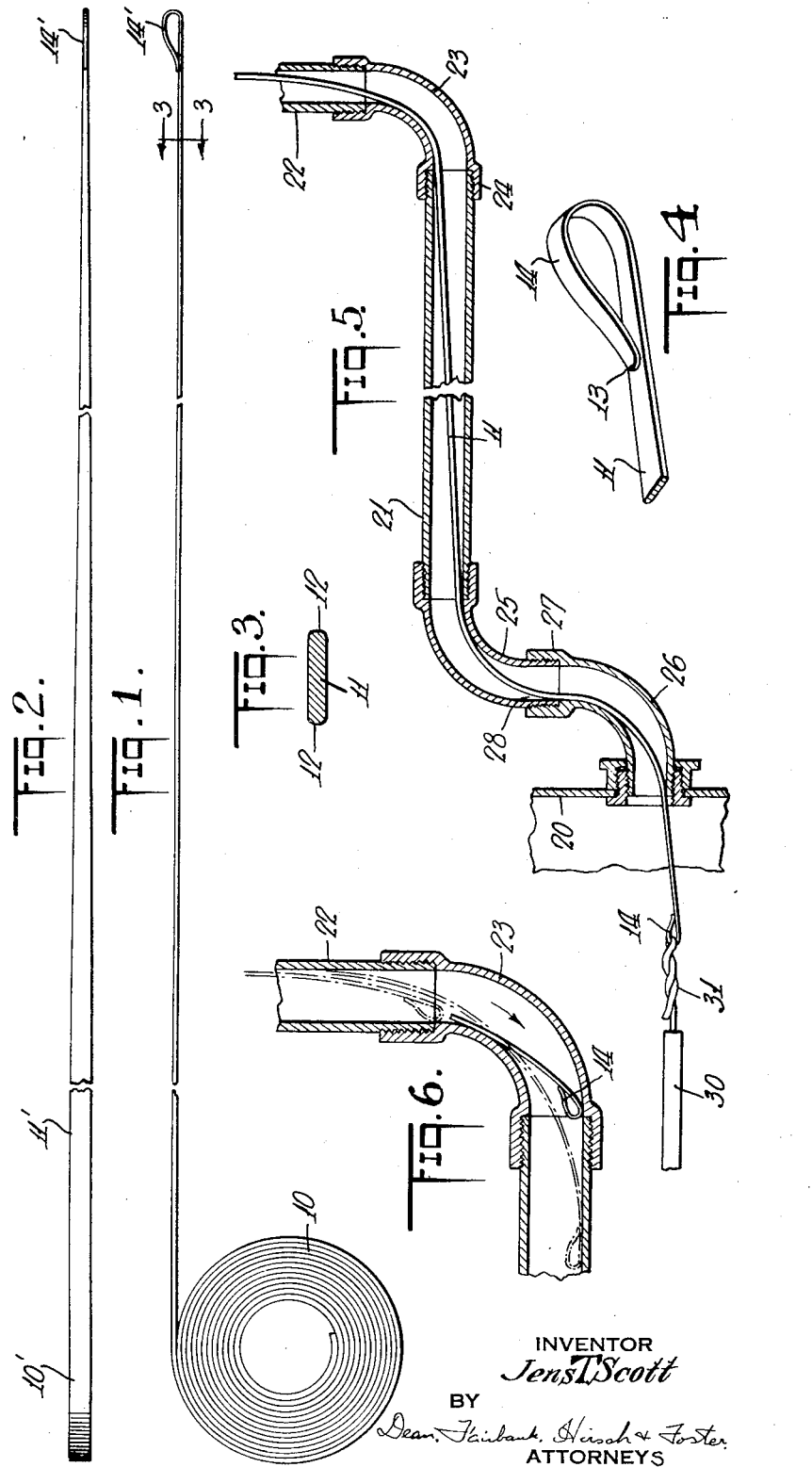
INVENTOR
Jens T. Scott
BY
Dean, Fairbank, Hirsch & Foster
ATTORNEYS Patented Feb. 6, 1934

1,946,037

UNITED STATES PATENT OFFICE 1,946,037

ELECTRIC FISH WIRE

Jens T. Scott, Brooklyn, N. Y.

Application October 14, 1931. Serial No. 568,651

6 Claims. (Cl. 175—376)

My present invention relates to electric conductor fishing implements, more particularly of the type employed for drawing a length of electric wire through a conduit previously installed in a building structure.

As conducive to a clear understanding of the invention, it is noted that electric fish-wires are commonly employed, which are to be inserted through one end of the conduit and pushed therethrough to the opposite end, whereupon the electric wire is hooked thereto and then drawn through the length of the conduit while reeling up the fish-wire. The end of such fish-wire as it is being pushed through the conduit will frequently jam or stick when it reaches an elbow fitting or other obstruction in the conduit, and the attempt to push the wire further, results in buckling, jamming, twisting, if not breaking, involving time-consuming and costly annoyance in freeing the wire from the obstruction, because of the difficulty of access to the jammed region.

An object of the invention is to provide a thoroughly reliable wire-fishing implement which involves no nose attachments apt to break off from the length of the implement, and no helical wire loops or carriage mechanism or other complications that adds materially to the cost and that involve the need for special precautions in the course of use.

Another object is to provide a fish wire similar in general appearance and simplicity to that of such wires in common use, and which is utilized in the same manner as such fish wires, and without the need for specialized reeling apparatus or special precautions and without the need even for handles, pliers or similar tools and which functions in the same manner as the fish wires commonly in use, except for the avoidance of the common and costly annoyance due to jamming, buckling or breaking in the course of pushing the fish wire through the conduit.

The expedient of strengthening or reinforcing the fish wire, while of course rendering less likely buckling or breaking of the fish wire in the attempt to force it through should it jam, adds to the cost and bulk of the fish wire, and tends to increase rather than decrease the likelihood of jamming.

According to the present invention an expedient diametrically opposed to what would naturally be resorted to has proved highly efficacious. The fish wire is not to be strengthened, but its advance end is to be weakened or rendered more flexible, but preferably in such manner as to avoid any tendency to flex in one direction rather than in the other. Accordingly as the advance end of the wire reaches an elbow or other turn or obstruction in the conduit, its extremely flexible advance or feeler end readily negotiates such turn, and there being no sharp increase in stiffness as the succeeding length of the fish wire is pushed past such turn or turns no kinking or buckling occurs and the fish wire is advanced without difficulty.

In the accompanying drawing, in which are shown one or more of various embodiments of the several features of the invention, Fig. 1 is a plan view of the reeled fish wire, with the tapered end projecting, Fig. 2 is a top view of the embodiment of Fig. 1, Fig. 3 is a transverse view taken on line 3—3 of Fig. 1, Fig. 4 is a fragmentary perspective view of the extremity of the wire, with the width thereof exaggerated for clearer disclosure, Fig. 5 is a fragmentary sectional view of a conduit installation illustrating the mode of use of the invention, and Fig. 6 is a fragmentary sectional view on a larger scale showing the manner of feeding the fish wire through an elbow.

Referring now to Figs. 1 and 2 of the drawing there is shown a steel fish wire which in general appearance is more or less conventional. It includes a reel 10 of flat wire 11 shown in Fig. 2 as, for instance, of 100, 200 or 300 feet, depending on the installation in which it is to be used, and its width which is uniform for nearly the entire length of the reel will depend on the size of conduit installation with which it is to be used, and may be as little as three-sixteenths of an inch or less to as much as an inch or more.

According to the present invention the advance end of the wire, preferably a length thereof in the order of ten feet, is tapered as at 12 and preferably symmetrically tapered, as shown, for gradual reduction in thickness and if desired also in width thereof to a dull point 13 at the extremity. In shape, the tapered end portion would thus be an equilateral trapezoid of base equal to the width of the wire and of height in the order of ten feet. The extremity of the tapered end is reversely bent into a loop 14 for tying on of the wire to be drawn through the conduit. Preferably the edges of the wire are rounded as appears particularly from Fig. 5, thereby to avoid any sharp corners especially at loop 14.

As best shown in Fig. 1, the thickness of the wire is tapered. By this simple expedient the end of the wire is caused readily to flex with equal facility in either direction at right angles to the width of the wire as indicated by arrows in Fig. 1.

Figs. 5 and 6 suggest the mode of use. A wall of an outlet box is suggested at 20, a main length of installed conduit at 21 and another length of such conduit at 22, illustratively at right angles to the main length. By way of illustration an elbow unit 23 of conventional construction joins sections 21 and 22 and has enlarged sockets 24 into which the extremities of the respective conduit lengths fit, so that their inner walls will extend substantially flush, as shown, with the inner wall of the elbow. The same arrangement appears at the opposite end, except that illustratively two elbow units 25 and 26 are inter-fitted to provide a double turn, the enlarged socket 27 of one of the elbow units accommodating the threaded end 28 (in this case not enlarged) of the other elbow unit, to afford a substantially flush wall. Of course the arrangement of elbows or other turns and their number will depend on the installation, and the showing on the drawing is merely fragmentary and illustrative.

As the loop end 14 of the electric fish wire passes through the conduit 22 as best shown in Fig. 8, it readily negotiates the turn at elbow 23. No sharp corners, enlargements or obstacles obstruct the advance or "feeler" end, and in view of its enhanced flexibility it is readily guided along the curved wall of the elbow as shown and thus readily makes the turn in the conduit. As soon as the advance "feeler" loop has thus passed the turn, the succeeding part of the fish wire readily follows without the likelihood of jamming, since the stiffness of the wire section passing the turn increases but very gradually after the advance end has passed therethrough. In due course the main unreduced length 11 of the fish wire passes the turn, having been guided thereinto by the gradual increase in stiffness of the portions successively reaching the turn. The same phenomenon described is repeated for each turn or double turn, bend or other irregularity or obstruction that the advance loop 14 of the fish wire is to negotiate in being pushed through the conduit. The stronger or stiffer length of fish wire is eased past the turn or obstruction by the flexible or weak feeler extremity and no rupture occurs as would, were there any sharp change in cross-section in the fish wire.

The main source of difficulty due to kinking, jamming or buckling by catching of the fish wire extremity at a turn or obstruction having been substantially precluded, the main length of the fish wire though of substantial strength, thickness and stiffness, will yet not buckle or kink in pushing through a conduit even of several hundreds of feet in length and having a multiplicity of elbows and turns.

Once the loop end 14 of the fish wire has reached the opposite end of the conduit and is exposed thereat, the end of the electric wire 30 is passed through the loop and secured thereto as at 31, and thereafter no difficulty is encountered in reeling up the fish wire and with it drawing the electric wire 30 through the conduit.

The advance end of the wire is so thin immediately beyond the wire fastening loop 14 that it flexes with equal facility in either direction perpendicular to the width of the wire, in accordance with the direction of the elbow or bend in the conduit. There is no tendency for the wire to break, bend or kink, since there is no sharp change of thickness or stiffness at the part of the wire moving past the turn or bend.

The taper of the width of the wire, preferably also employed, has no very marked effect on the flexibility of the wire perpendicular to its width, but this taper does help to guide the wire toward the center of the conduit runway.

Thus, the present invention affords a fish wire which even though of length adapted to the longest conduit commonly employed in building constructions, can be readily pushed through the conduit by hand, without the need for any particular wire feeding machine and without the need even for feed handles, pliers or other grasping tools. The operator readily pushes the wire through the conduit, and even though that conduit has many elbows, when the wire is reeled out of the conduit, it presents no kinks, bends or buckling.

While it is ordinarily preferred to taper only say about ten feet of the fish wire end as previously described, there is nothing critical about this length and the tapering may be for a length less than ten feet or for a length as much greater than ten feet as desired.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:

1. An electric conductor-fishing implement comprising a length of flat wire corresponding to the length of the conduit with which it is to be used, the conductor-holding end of said wire being of uniformly tapered thickness, and having a reversely bent loop at its extremity.

2. An electric conductor-fishing implement comprising a length of flat wire corresponding to the length of conduit with which it is to be used, several feet of the conductor-holding end of said wire being uniformly tapered in width and also in thickness to substantially a dull point at the extremity thereof.

3. An electric conductor-fishing implement comprising a length of flat wire corresponding to the length of conduit with which it is to be used, several feet of the conductor-holding end of said wire being uniformly tapered in width and also in thickness to substantially a dull point at the extremity, the extreme end of said wire being reversely bent to form a holding loop.

4. An electric conductor-fishing implement comprising a length of flat wire corresponding to the length of conduit with which it is to be used, several feet of the conductor-holding end of said wire being uniformly and symmetrically tapered in width to the extremity thereof, said tapered end being also tapered in thickness and having a conductor-tying conformation at the extremity thereof.

5. An electric conductor-fishing implement comprising a length of flat wire corresponding to that of the conduit with which it is to be used, several feet of the conductor-holding end of said wire being symmetrically tapered in width, and also symmetrically tapered in thickness to substantially a dull point at the extremity thereof, the wire being reversely bent at said extremity to form a conductor-tying loop.

6. An electric conductor fishing implement suitable for use in the absence of handling tools, comprising a length of flat wire corresponding to the length of the conduit with which it is to be used, several feet of the conductor holding end of said wire being of uniformly tapered thickness, the thinnest portion of said wire being at the extremity thereof, and means at said extremity for tying a wire thereto.

JENS T. SCOTT.